United States Patent
Lynn, Jr. et al.

(10) Patent No.: US 10,021,027 B2
(45) Date of Patent: Jul. 10, 2018

(54) NETWORK VALIDATION WITH DYNAMIC TUNNELING

(71) Applicant: Comcast Cable Communications, LLC, Philadelphia, PA (US)

(72) Inventors: Thomas William Lynn, Jr., Berryville, VA (US); Phillip Andrew Sanderson, Mount Laurel, NJ (US); Brad A. Hilgenfeld, Winchester, VA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 286 days.

(21) Appl. No.: 13/874,008

(22) Filed: Apr. 30, 2013

(65) Prior Publication Data

US 2014/0321277 A1    Oct. 30, 2014

(51) Int. Cl.
*H04L 12/703* (2013.01)
*H04L 12/801* (2013.01)
(Continued)

(52) U.S. Cl.
CPC .......... *H04L 47/10* (2013.01); *H04L 12/4633* (2013.01); *H04L 12/6418* (2013.01); *H04L 41/0654* (2013.01); *H04L 41/0668* (2013.01); *H04L 43/0811* (2013.01); *H04L 43/0817* (2013.01); *H04L 45/22* (2013.01);
(Continued)

(58) Field of Classification Search
CPC . H04L 12/4633; H04L 12/6418; H04L 45/00; H04L 45/22; H04L 45/026; H04L 45/125; H04L 47/825; H04L 47/11; H04L 45/28; H04L 41/0663; H04L 45/50; H04L 43/10; H04L 61/2592; H04L 29/12575;
(Continued)

(56) References Cited

U.S. PATENT DOCUMENTS 7,471,679 B2 * 12/2008 Lee ................................ 370/390
7,564,801 B2 *  7/2009 Narayanan ..................... 370/254
(Continued)

FOREIGN PATENT DOCUMENTS

CA          2850874         4/2014
CN          101815106 A     8/2010
(Continued)

OTHER PUBLICATIONS

Aggarwal et al., "Signaling Tunnel Encapsulation/Deencapsulation Capabilities", Feb. 2003, Network Working Group Internet Draft, 9 Pages.*

(Continued)

*Primary Examiner* — Edan Orgad
*Assistant Examiner* — Ivan O Latorre
(74) *Attorney, Agent, or Firm* — Ballard Spahr LLP

(57) ABSTRACT

Systems and methods for provisioning and validating a network are disclosed. One method can comprise providing a first communication tunnel between a network access point and a first tunnel endpoint. Availability of the first tunnel endpoint can be determined. If the first tunnel endpoint is determined to be available, network traffic can be routed to the first tunnel endpoint. If the first tunnel endpoint is determined to be unavailable, a second communication tunnel between the network access point and a second tunnel endpoint can be provided.

20 Claims, 9 Drawing Sheets

(51) Int. Cl.
*H04L 12/26* (2006.01)
*H04L 12/24* (2006.01)
*H04L 12/46* (2006.01)
*H04L 12/707* (2013.01)
*H04L 12/64* (2006.01)
*H04L 29/12* (2006.01)
*H04L 12/723* (2013.01)

(52) U.S. Cl.
CPC .............. *H04L 43/10* (2013.01); *H04L 45/28* (2013.01); *H04L 45/50* (2013.01); *H04L 61/103* (2013.01); *H04L 61/2015* (2013.01)

(58) Field of Classification Search
CPC ... H04W 76/022; H04W 48/08; H04W 40/24; H04W 24/04; H04W 40/02
USPC .... 370/217, 220, 230, 235, 401, 395.2, 225, 370/338, 389, 351, 232; 714/4.11, 4.12, 714/4.2; 709/238
See application file for complete search history.

(56) References Cited

U.S. PATENT DOCUMENTS

| | | | |
|---|---|---|---|
| 7,616,613 B2* | 11/2009 | Sanzgiri et al. | 370/338 |
| 7,801,021 B1* | 9/2010 | Triantafillis | H04L 12/4633 370/216 |
| 7,898,977 B2 | 3/2011 | Roese et al. | |
| 8,018,956 B1* | 9/2011 | Deng et al. | 370/401 |
| 8,787,150 B2* | 7/2014 | Fiorone et al. | 370/217 |
| 2003/0110276 A1* | 6/2003 | Riddle | 709/230 |
| 2004/0013118 A1* | 1/2004 | Borella | H04L 12/4633 370/395.2 |
| 2004/0202183 A1* | 10/2004 | Thubert et al. | 370/395.31 |
| 2004/0228343 A1* | 11/2004 | Molteni | H04L 12/4625 370/392 |
| 2004/0261116 A1 | 12/2004 | Mckeown et al. | |
| 2005/0015810 A1 | 1/2005 | Gould et al. | |
| 2006/0092964 A1* | 5/2006 | Park et al. | 370/437 |
| 2008/0123521 A1* | 5/2008 | Vasseur et al. | 370/217 |
| 2008/0144641 A1* | 6/2008 | Le Roux et al. | 370/401 |
| 2008/0195733 A1* | 8/2008 | Detienne | H04L 12/2602 709/224 |
| 2008/0291920 A1* | 11/2008 | Serbest | H04L 12/4633 370/395.31 |
| 2011/0055622 A1* | 3/2011 | Arai et al. | 714/4 |
| 2011/0158162 A1 | 6/2011 | Mizikovsky et al. | |
| 2012/0110152 A1* | 5/2012 | Wing et al. | 709/223 |
| 2012/0236708 A1* | 9/2012 | Kompella et al. | 370/220 |
| 2013/0058345 A1* | 3/2013 | Kano | H04L 12/4633 370/392 |
| 2013/0238811 A1* | 9/2013 | Chidambaram et al. | 709/233 |
| 2013/0259060 A1* | 10/2013 | Liu et al. | 370/401 |
| 2013/0336103 A1* | 12/2013 | Vasseur et al. | 370/216 |
| 2013/0336116 A1* | 12/2013 | Vasseur et al. | 370/235 |
| 2014/0018037 A1* | 1/2014 | Shanmugavadivel et al. | 455/411 |
| 2014/0157042 A1* | 6/2014 | Johnson et al. | 714/4.11 |
| 2014/0204730 A1* | 7/2014 | Sampath et al. | 370/220 |

FOREIGN PATENT DOCUMENTS

| | | |
|---|---|---|
| EP | 1075118 A2 | 2/2001 |
| EP | 14166418 | 4/2014 |
| GB | 2485024 A | 5/2012 |
| WO | WO-2008/043374 A1 | 4/2008 |
| WO | WO-2012035366 A1 | 3/2012 |

OTHER PUBLICATIONS

Alcatel Lucent, "7750 SR OS Triple Play Guide", Software version 7750 SR OS 10.0.R4, Jul. 2012, Document Part Number: 93-0098-08-02, 26 Pages.*

Lee, Y., et al. "Dynamic load-balancing and failover for wireless base station." Comcast, IP.Com Journal, p. 1-2 (2011).

Extended European Search Report dated Aug. 6, 2014 for European Patent Application No. 14166418.5, which was filed on Apr. 29, 2014 and published as EP 2800308 on Nov. 5, 2014 (Inventor—Lynn; Applicant—Comcast Corp.) (pp. 1-7).

U.S. Appl. No. 13/732,906, filed Jan. 2, 2013, 2014-0185536, Jul. 3, 2014, Lynn (Comcast Corp.).

\* cited by examiner

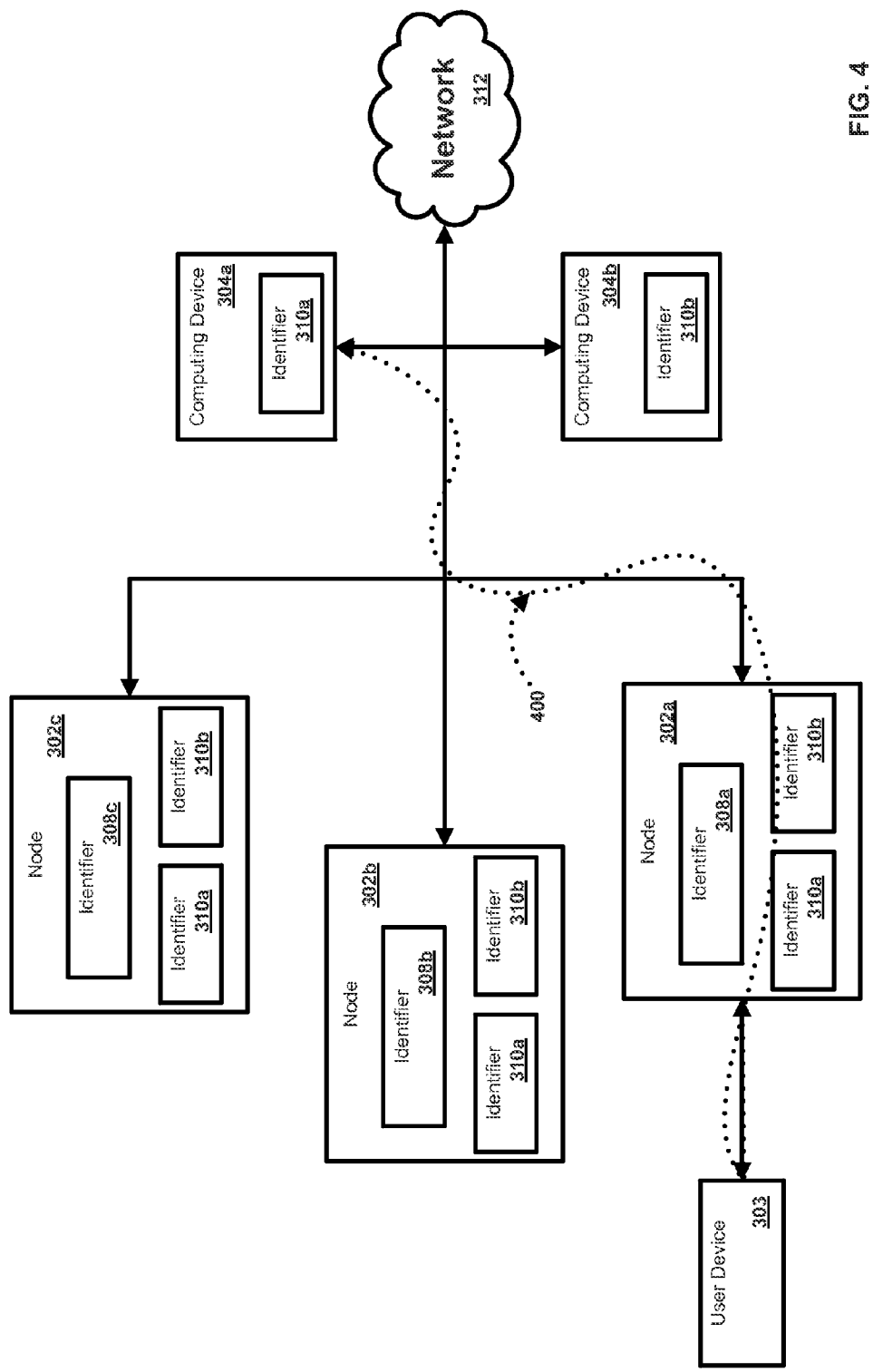

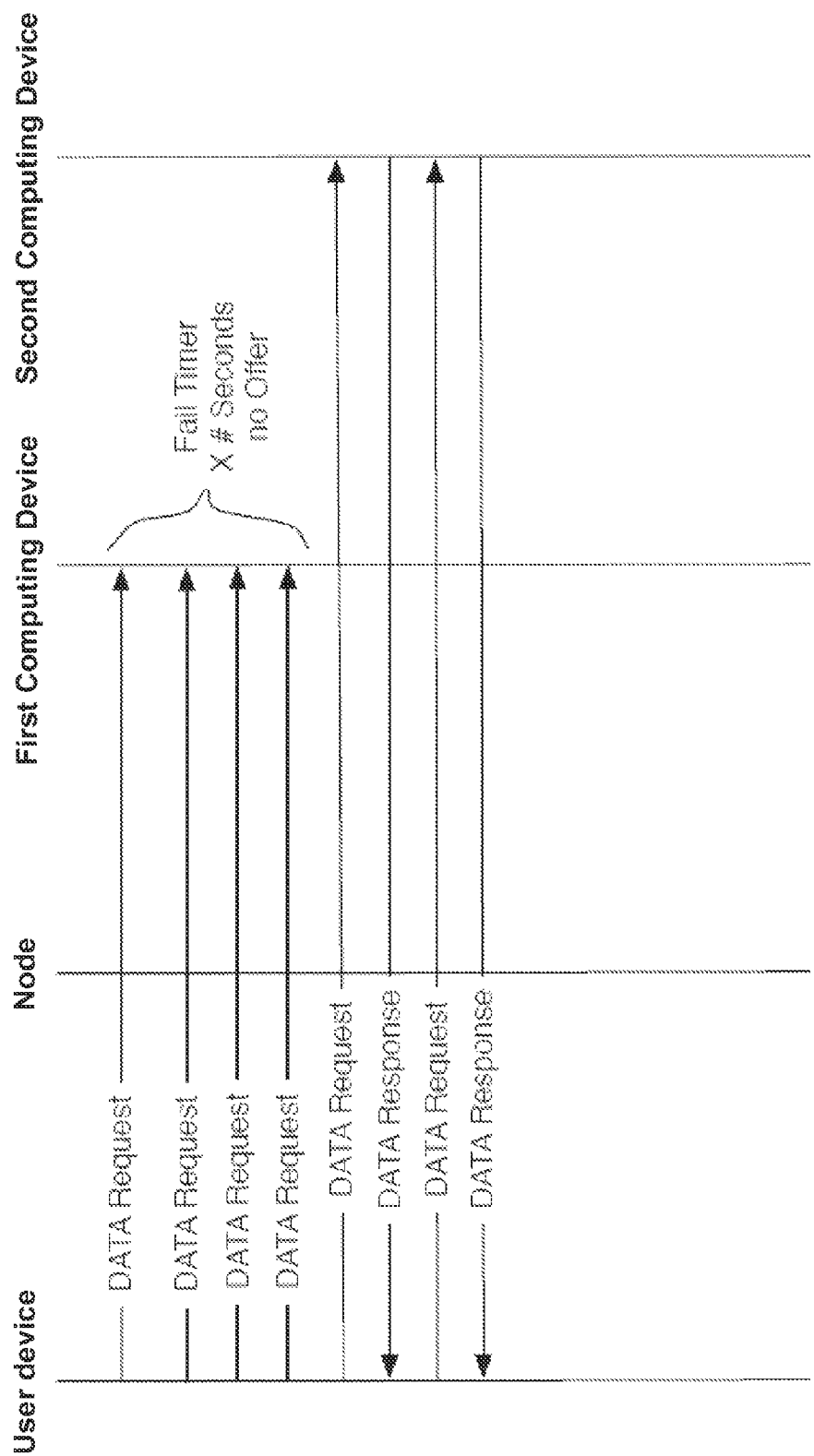

NETWORK VALIDATION WITH DYNAMIC TUNNELING

BACKGROUND

A network, such as a wireless network, can comprise one or more access points (AP) to provide a means for one or more user devices to communicate with and/or over the network. A wireless access point can comprise a device that allows other wireless devices to connect to a wired network, or another wireless network, using Wi-Fi, Bluetooth, or related standards.

Network devices, such as a gateway or concentrator, can connect to AP's to manage network traffic. In certain network implementations, such as generic routing encapsulation (GRE) based protocols, a network device can be pre-configured as an endpoint of a static tunnel for each access point. Such a configuration consumes network resources even when the tunnels are not in use, negatively impacts scaling for network devices, and can be cost prohibitive. This disclosure addresses these and other shortcomings relating to network provisioning.

SUMMARY

It is to be understood that both the following general description and the following detailed description are exemplary and explanatory only and are not restrictive, as claimed. Provided are methods and systems for provisioning one or more network devices and/or validating availability of one or more network devices. The methods and systems described herein, in one aspect, can provision one or more access points of a network. As an example, provisioning AP tunnels (such as GRE or soft GRE tunnels) to available gateway endpoints can maintain network traffic transmissions despite failure of a network device or communication path.

In an aspect, methods can comprise providing a first communication tunnel between a network access point and a first tunnel endpoint. The methods can determine the availability of the first tunnel endpoint. If the first tunnel endpoint is available, network traffic can be routed to the first tunnel endpoint. If the first tunnel endpoint is unavailable, a second communication tunnel can be provided between the network access point and a second tunnel endpoint.

In another aspect, methods can comprise providing a plurality of identifiers to a first network device. A first identifier of the plurality of identifiers can be selected and the availability of a second network device associated with the selected first identifier can be determined. A second identifier of the plurality of identifiers can be selected and the availability of a third network device associated with the selected second identifier can be determined.

In a further aspect, methods can comprise providing a first communication tunnel between a network access point and a first tunnel endpoint. Network traffic can be transmitted to the first tunnel endpoint via the first communication tunnel. If a response is received from the first tunnel endpoint within a threshold time period, transmission of network traffic to the first tunnel endpoint can be continued. If no response is received from the first tunnel endpoint within the threshold time period, a second communication tunnel can be provided between the network access point and a second tunnel endpoint.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a block diagram of an exemplary system and network;

FIG. 5 is a diagram of network data transmission;

DETAILED DESCRIPTION

Figure 1:
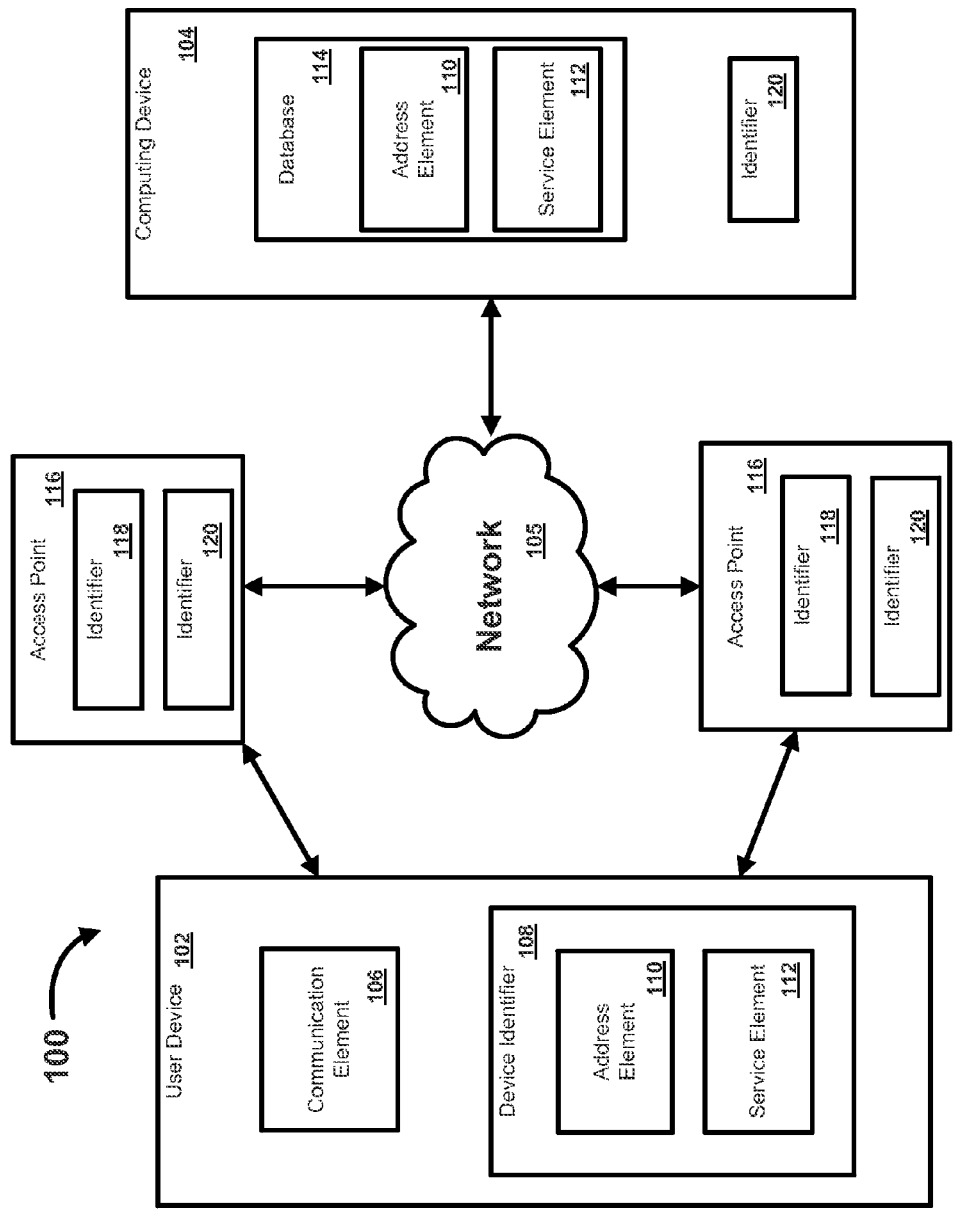
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can provision one or more network devices and/or validate availability of one or more network devices. In another aspect, the methods and systems described herein can provision one or more access points of a network. As an example, AP tunnels (such as GRE or soft GRE tunnels) to available gateway endpoints can be provisioned so as to maintain transmission of network traffic in the event of network device failure or communication path failure.

In an aspect, soft GRE can be implemented as a data triggered implementation of the GRE protocol (RFC 1701, 1702, 2784, 2890, hereby incorporated by reference in their entirety) to facilitate bridging over Layer 3 Networks. In standard GRE implementations each of the access point and the gateway can be configured statically with an identifier (e.g., internet protocol (IP) address, Multiprotocol Label Switching identifier (MPLS-ID)) of the other. In soft GRE the access point can be statically configured with an identifier of the gateway. As such, the gateway can dynamically create a connection to the access point when the access point transmits GRE traffic to the gateway. In such an implementation, an access point can be configured with a loopback IP of a network device (e.g., gateway, concentrator, etc.) as its GRE destination. In another aspect, the network device may not have pre-configured information about the access point. As such, the network device can dynamically assign router resources upon receipt of soft GRE traffic from an access point. The methods and systems described herein, in another aspect, can be configured to allow access points to determine functionality and availability of one or more network devices.

FIG. 1 illustrates various aspects of an exemplary network in which the present methods and systems can operate. The present disclosure is relevant to systems and methods for providing services such as network connectivity to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a network device such as a gateway, router, concentrator, or server for communicating with the user device 102. As an example, the computing device 104 can communicate with the user device 102 for providing services such as network (e.g., IP) services. Services can comprise: IP allocation stateless auto-configuration for IPv6, DHCPv4, DHCPv6, and/or router advertisement; DNS configuration via DHCPv4&v6 and ICMPv6 (router advertisement); access control, authentication, captive portal redirects; network connectivity to services via the Internet; quality of service (QoS) control; parental controls; directed subscriber notifications; application assurance; subscriber based policies on a per-user basis; accounting; network peering with cellular providers evolved packet core; network authentication/accounting with external entities such as other service Providers; or a combination thereof. In an aspect, the computing device 104 can allow the user device 102 to interact with remote resources such as data, devices, and files.

In an aspect, the computing device 104 can manage the communication between the user device 102 and a database 114 for sending and receiving data therebetween. As an example, the database 114 can store a plurality of data sets (e.g., routing tables), user identifiers or records, authentication information, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with a network such as network 105. In another aspect, one or more access points 116 can be configured as the network 105. As an example, one or more of the access points 116 can facilitate the connection of a device, such as user device 102, to the network 105. As a further example, one or more of the access points 116 can be configured as a wireless access point (WAP). In an aspect, one or more access points 116 can be configured to allow one or more wireless devices to connect to a wired and/or wireless network using Wi-Fi, Bluetooth, or similar standard.

In an aspect, the access points 116 can be configured as a mesh network. As an example, one or more access points 116 can comprise a multi-band wireless access point, for example, a dual band wireless access point. As an example, the access points 116 can be configured with a first service set identifier (SSID) (e.g., associated with a user network or private network) to function as a local network for a particular user or users. As a further example, the access points 116 can be configured with a second service set identifier (SSID) (e.g., associated with a public/community network or a hidden network) to function as a secondary network or redundant network for connected communication devices. Additional SSID's can be used.

In an aspect, one or more access points 116 can comprise a multi-band wireless access point, a dual band wireless access point for example. As an example, the access points 116 can be configured with a first service set identifier (SSID) to function as a general network. As a further example, the access points 116 can be configured with a second service set identifier (SSID) to function as an emergency network, government network, secure network, or limited use network, or a combination thereof. Additional SSID's can be used.

In an aspect, one or more access points 116 can each comprise one or more first identifiers 118. As an example, one or more identifiers can be one or more media access control addresses (MAC addresses). As a further example, one or more first identifiers 118 can be one or more unique identifiers (e.g., IPv4 address, IPv6 address, etc.) for facilitating communications on the physical network segment. In an aspect, each of the access points 116 can comprise one or more first identifiers 118. As an example, the first identifiers 118 can be associated with a physical location of the access points 116. As a further example, the first identifiers 118 can comprise one or more of an IP Address, serial number, latitude/longitude, geo-encoding, custom assigned unique identifier, global unique identifier (GUID), and the like.

In an aspect, other data points and/or devices can be assigned one or more second identifiers 120 (e.g., IPv4 Address, IPv6 Address, DNS A Record, DNS SRV Record, etc.). As an example, the second identifiers 120 can be assigned to one or more devices, such as computing devices 104, routers, gateways, concentrators, terminals, cable modem termination systems (CMTS), switches, and/or Geo Polygon or network aggregation points with many routers or chosen service type. As a further example, the second identifiers 120 can be relied upon to make decisions for provisioning one or more access points 116. In an aspect, the second identifiers 120 can be used to establish an encapsulation tunnel such as a GRE tunnel or soft GRE tunnel. As an example, the one or more of the second identifiers 120 can be used to designate a tunnel endpoint. As a further example, one or more of the user device 102 and the access points 106 can use the second identifiers 120 to establish the computing device 104 as a tunnel endpoint of an encapsulation tunnel. As such, network traffic can be routed through the tunnel to the computing device 104. In certain aspects, if the computing device 104 is determined to be unavailable, an alternative encapsulation tunnel can be provided to rout traffic to a failover network device.

Figure 2:
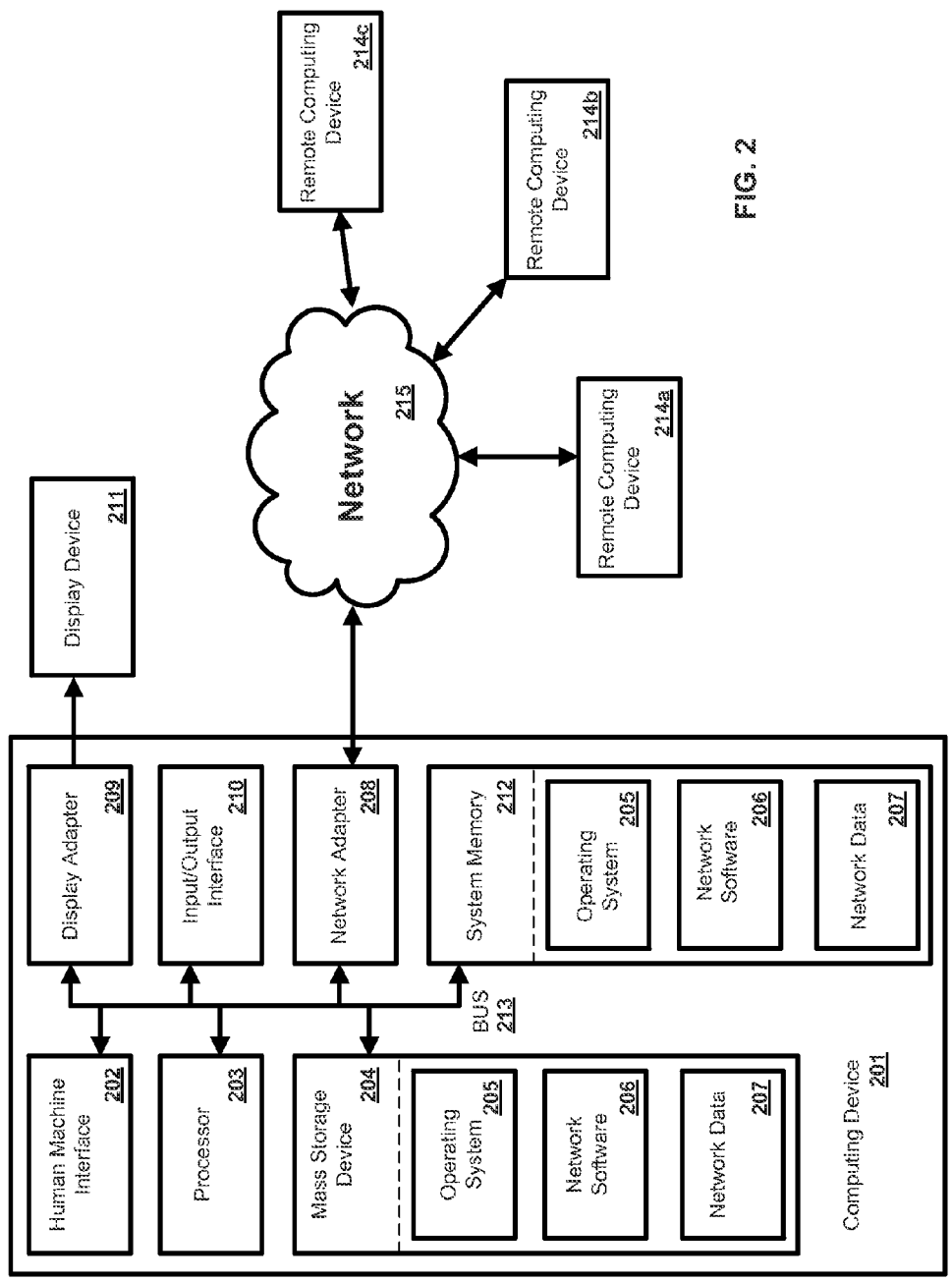
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
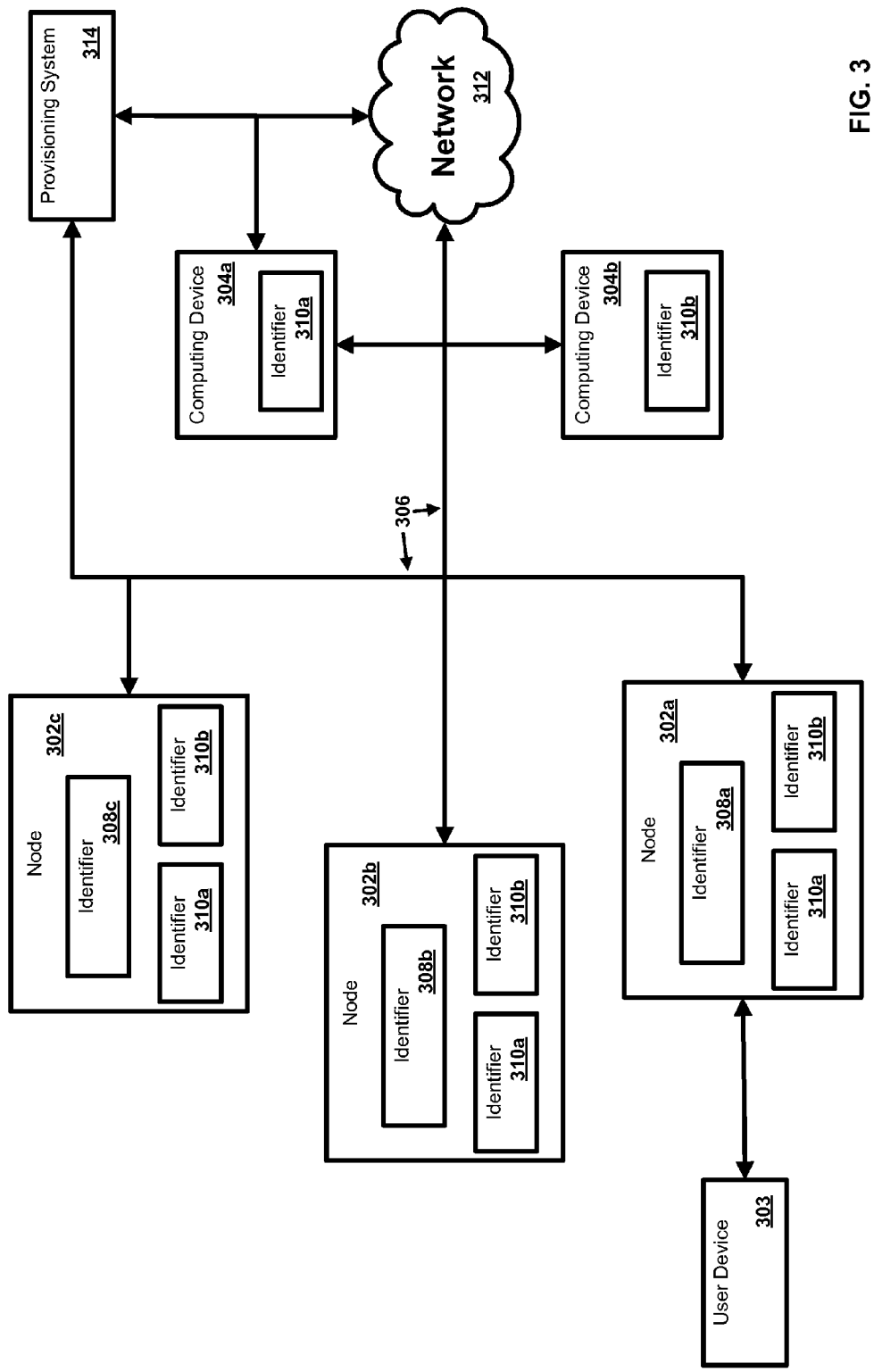
FIG. 3 is a block diagram of an exemplary system and network.

FIG. 3 illustrates an exemplary system and network. In an aspect, a plurality of nodes 302a, 302b, 302c can be in communication with one or more user devices 303 and one or more computing devices 304a, 304b. As an example, one or more nodes 302a, 302b, 302c can be a network access point, router, switch, communication device, or the like. As another example, one or more user devices 303 can be a device such as a computer, a smartphone, a laptop, a tablet, a set top box, a display device, or other device capable of communicating with one or more of the nodes 302a, 302b, 302c of the network. As a further example, one or more of the computing devices 304a, 304b can be a gateway, a concentrator, a router, a switch, a communication device terminal server, a cable modem termination system, and the like. One or more of the computing devices 304a, 304b can be a multiplexer or similar device for combining and/or aggregating multiple channels onto a single transmission medium in such a way that multiple channels can be simultaneously active. For example, one or more of the computing devices 304a, 304b can be configured in a local-area network (LAN) to combine transmissions from a cluster of nodes. As a further example, one or more of the computing devices 304a, 304b can be a tunnel concentrator for combining multiple encapsulated channels or tunnels. Tunneling and encapsulation can comprise the techniques described in RFC 1701, 1702, 2784, 2890. Other headers, packet processing, and encapsulated payload processes can be used.

In an aspect, one or more of the nodes 302a, 302b, 302c can be configured to communicate with another of the nodes 302a, 302b, 302c and/or one or more of the computing devices 304a, 304b via one or more communication paths 306. In an aspect, the one or more communication paths 306 can comprise one or more uninterrupted communication links, sequential links, pre-defined paths or links, and/or intervening nodes. As an example, one or more of the communication paths can comprise one or more of the nodes 302a, 302b, 302c. As a further example, one or more of the nodes 302a, 302b, 302c can be configured as a mesh network. In an aspect, one or more of the communication paths 306 can be configured to transmit one or more services.

In an aspect, one or more of the nodes 302a, 302b, 302c can comprise one or more identifiers 308a, 308b, 308c. As an example, one or more identifiers 308a, 308b, 308c can be a media access control address (MAC address). As a further example, one or more identifiers 308a, 308b, 308c can comprise one or more of an IP Address, a serial number, latitude/longitude, geo-encoding, a custom assigned unique identifier, a global unique identifier (GUID), and the like. As a further example, one or more identifiers 308a, 308b, 308c can be a unique identifier for facilitating communications on the physical network segment.

In an aspect, one or more of the computing devices 304a, 304b can comprise one or more identifiers 310a, 310b. As an example, one or more identifiers 310a, 310b can be a media access control address (MAC address). As a further example, one or more identifiers 310a, 310b can comprise one or more of an IP Address, a serial number, latitude/longitude, geo-encoding, a custom assigned unique identifier, a global unique identifier (GUID), and the like. As a further example, one or more identifiers 310a, 310b can be a unique identifier for facilitating communications on the physical network segment.

In an aspect, the computing devices 304a, 304b can be implemented to perform functions such as authentication and authorization. The computing devices 304a, 304b can provide services such as IP allocation stateless auto-configuration for IPv6, DHCPv4, DHCPv6, and/or router advertisement; DNS configuration via DHCPv4&v6 and ICMPv6 (router advertisement); access control, authentication, captive portal redirects; network connectivity to services via the Internet; quality of service (QoS) control; parental controls; directed subscriber notifications; application assurance; subscriber based policies on a per-user basis; accounting; network peering with cellular providers evolved packet core; network authentication/accounting with external entities such as other Cable Providers; or a combination thereof. As an example, the computing devices 304a, 304b can control which user devices (e.g., user device 303) are allowed access to which services such as connectivity to a network 312. As a further example, the computing devices 304a, 304b can control the resources available to the network of nodes 302a, 302b, 302c.

In an aspect, one or more of the nodes 302a, 302b, 302c can store, retrieve, and/or access one or more identifiers 310a, 310b for communicating with the associated computing devices 304a, 304b. As an example, the one or more of the nodes 302a, 302b, 302c can be configured to provide an encapsulation tunnel between the one or more of the nodes 302a, 302b, 302c one or more of the computing devices 304a, 304b using the one or more identifiers 310a, 310b. As an example, the one or more identifiers 310a, 310b can be used by the one or more of the nodes 302a, 302b, 302c to designate one or more of the computing devices 304a, 304b as a tunnel endpoint.

In an aspect, a provisioning system 314 can communicate provisioning information to one or more of the nodes 302a, 302b, 302c, the computing devices 304a, 304b, and/or the user devices 303. Provisioning information can comprise one or more of tunnel end point IPs, radio SSID assignments, radio configurations, virtual local area network (VLAN) tags, multiprotocol label switching (MPLS) labels, and/or information relating to domain name system (DNS) servers, network time protocol (NTP) servers, simple network management protocol (SNMP) servers, radius servers, quality of service (QOS), trivial file transfer protocol (TFTP) configuration servers, and the like. As an example, the provisioning information can be communicated via a DOC-SIS Boot File and/or via DNS global server load balancing (GSLB). As another example, HTTP/HTTPS Servers can be called by the AP to return provisioning information. As a further example, one or more dynamic host configuration protocol (DHCP) Servers can provide provisioning information via DHCP options headers during DHCP communication.

In an aspect, in the open systems interconnection (OSI) reference model, a virtual layer 2 connection can be provided to facilitate the connectivity of one or more user devices and one or more access points of a network. In an aspect, an encapsulation of layer 2 frames over layer 3 networks enables an access point to act as a layer 2 bridge between a client and a gateway or concentrator.

FIG. 4 illustrates an exemplary system and network. In an aspect, one or more of the nodes 302a, 302b, 302c and the computing devices 304a, 304b can be provisioned to determine availability of network devices for providing one or more services. In another aspect, one or more of the communication paths can be encapsulated using protocols such as GRE or soft GRE. As an example, one or more encapsulation tunnels 400 can be provisioned (e.g., established, generated, activated, enabled, etc.) between one or more nodes 302a, 302b, 302c and one or more computing devices 304a, 304b. Such a configuration can be used in a network failure situation to determine if the one or more nodes 302a, 302b, 302c should failover to a particular computing device 304a, 304b or to disable the broadcast of a configured SSID entirely. As a further example, provisioning tunnels 400, such as GRE or soft GRE tunnels, to available gateway endpoints (e.g., computing devices 304a, 304b) can maintain transmission of network traffic in the event of a failure of a network device or communication path.

In an aspect, one or more encapsulation tunnels 400 can be provided by one or more of initial tunnel creation by client association with DHCP, initial tunnel creation by client association without DHCP (data triggered event), or existing tunnel validation during active client association. As an example, an access point (e.g., node 302a, 302b, 302c) can be configured as a layer 2 bridge and GRE can be implemented as a layer 2 tunneling protocol where client traffic is bridged across GRE to one or more of the computing devices 304a, 304b. As such, the user device 303 can access one or more services via the computing devices 304a, 304b. As a further example, soft GRE can be implemented as a data triggered implementation of the GRE protocol to facilitate bridging over Layer 3 Networks. In such as implementation, an access point (e.g., node 302a, 302b, 302c) can be configured with a loopback IP of a network device (e.g., gateway, concentrator, computing devices 304a, 304b, etc.) as its GRE destination. In another aspect, the network device may not have pre-configured information about the access point. As such, the network device can dynamically assign router resources upon receipt of traffic from an access point. The methods and systems described herein, in another aspect, can be configured to allow access points to determine functionality and availability of one or more network devices.

In an aspect, availability of a network device (e.g., computing devices 304a, 304b) can be determined using one or more active processes. As an example, Internet control message protocol (ICMP) echo/echo reply can be implemented outside of a GRE tunnel. Such an implementation can be performed based on an identifier, such as the IP address of the access point GRE endpoint (e.g., node 302a, 302b, 302c) to the gateway GRE endpoint (e.g., computing devices 304a, 304b). As another example, ICMP echo/echo reply can be implemented inside of the GRE Tunnel. Using the IP and MAC of an associated client, the access point can send an ICMP echo packet to a default gateway and expect an ICMP echo reply to return from the gateway. As a further example, an ICMP echo/unreachable reply can be implemented inside of the GRE tunnel. Such an implementation can comprise transmitting an echo request to an IP address from an access control list (ACL) blocked list and can expect a reply of ICMP unreachable.

In an aspect, availability of a network device (e.g., computing devices 304a, 304b) can be determined using address resolution protocol (ARP) inside of the GRE tunnel. The same secondary IP address can be bound to one or more gateway client network interfaces. As such, ARP can be used from the access point through the tunnel and an ARP reply can be expected. In another aspect, DHCP can be implemented to determine availability of a network device. As an example, a full DHCP discover, offer, request and Acknoledgement (ACK) can be implemented from the access point (e.g., media access control (MAC) address). As another example, a DHCP request can be customized for an IP address that is known to be an IP address to which the gateway will respond with DHCP NAK. As a further example, a DHCP request can be customized based upon an attribute (e.g., DHCPInform, DNS server or domain name) to which a DHCP ACK is expected.

In an aspect, availability of a network device (e.g., computing devices 304a, 304b) can be determined by transmitting operations, administration, and maintenance/connectivity fault management (OAM/CFM) packets (or some other layer 2 packets) from the gateway tunnel endpoint, which the AP could expect to receive. If the packets are not received within a configurable amount of time it can be assumed that the gateway tunnel endpoint in unavailable. As an example, a layer 2 packet can be transmitted as return traffic once the access point transmits an initial GRE data to the gateway. The gateway can stop sending this layer 2 return packet after the access point stops transmitting GRE packets. A timer or time period can be set to trigger the stoppage of transmission of the layer 2 packet after the access point transmits the GRE traffic. The time period can be any time period such as from about 100 milliseconds to about 1 second, 1 second to about 6 minutes, about 1 second to about 5 seconds, about 1 second to about 10 seconds, about 5 seconds to about 30 seconds, about 30 seconds to about 1 minute, about 1 minute to about 2.5 minutes, or other time periods. The time period can be based upon the DHCP lease time associated with one or more of the network devices, service provider, or network provider.

In an aspect, availability of a network device (e.g., computing devices 304a, 304b) can be determined using one or more passive processes. As an example, packets transmitted and received by one or more of a user device (e.g., client), an access point (e.g., node 302a, 302b, 302c), and a network device (e.g., gateway, computing devices 304a, 304b, etc.) can be tracked. As a further example, if packets are transmitted and none are received after a time period expires, the data flow can be considered unidirectional (e.g. the tunnel end point is not responding). The time period can be set based upon an expectation that DHCP ACK is received at about ½ the time of the DHCP lease (e.g., for a 300 second lease, it can be expected that ½ the time 150+10 seconds could be a time period to set as an inactivity time period). Other time periods can be used.

In an aspect, availability of a network device (e.g., computing devices 304a, 304b) can be determined using DHCP from an access point (e.g., node 302a, 302b, 302c). As an example, a DHCP request and DHCP ACK can be implemented (e.g., at half of the configured lease time). If the access point transmits a DHCP Request but does not receive a DHCP ACK in a given duration of time, it can be assumed the network device is unavailable.

In an aspect, the availability of a network device (e.g., computing devices 304a, 304b) can be determined using ARP from an access point (e.g., node 302a, 302b, 302c). As an example, ARP packets that the client typically sends at a designated ARP interval can be used as an indicator of availability. If the access point (e.g., node 302a, 302b, 302c) transmits an ARP request but does not receive an ARP response in a given duration of time, it can be assumed the network device is unavailable.

Figure 6A:
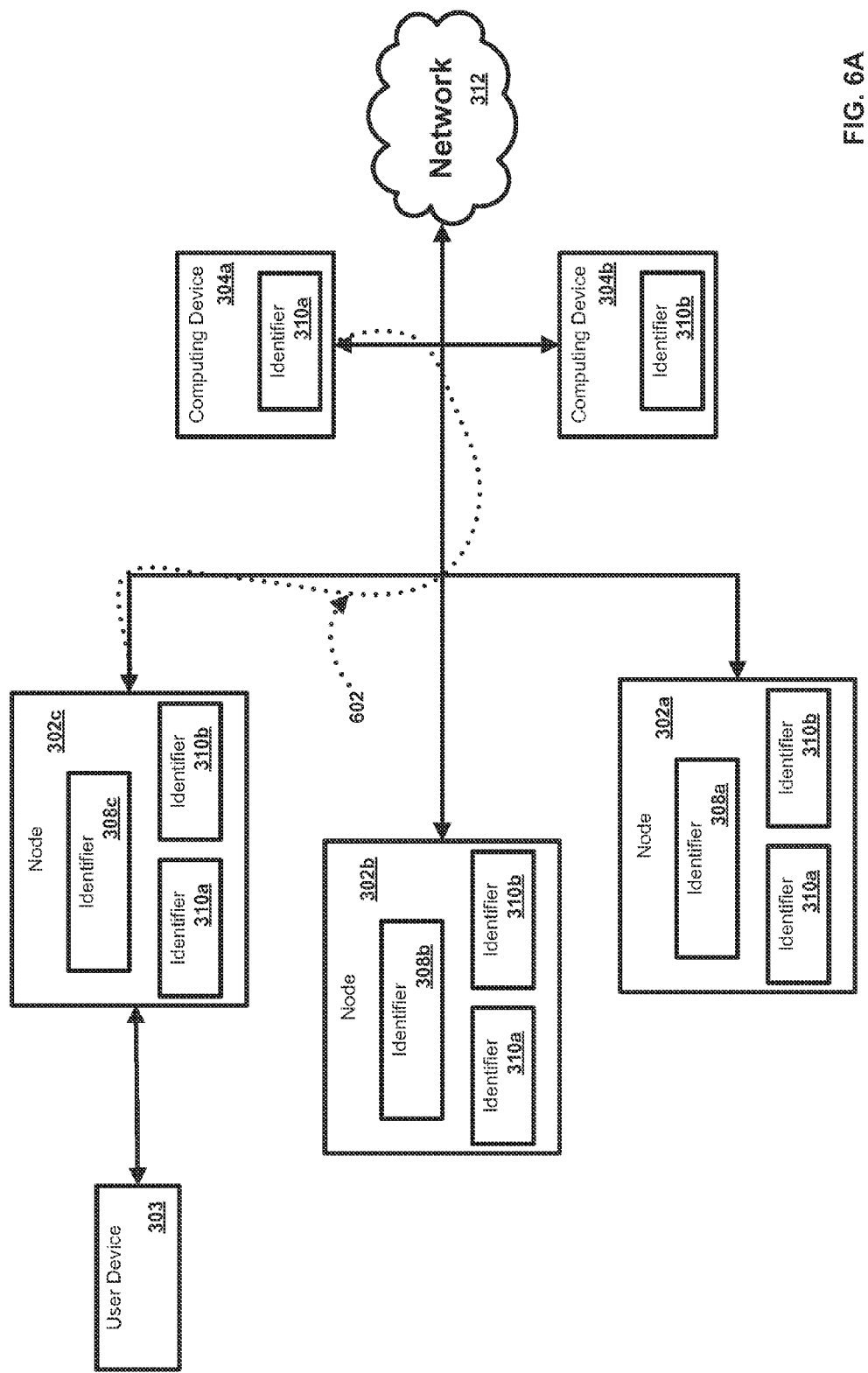
FIG. 6A is a block diagram of an exemplary system and network.

As illustrated in FIGS. 5 and 6A, one or more devices can determine availability of one or more network devices. In an aspect, user device 303 can be in communication with node 302c via a local area network (LAN) such as a wireless LAN. Other communication networks can be used. In another aspect, the user device 303 can transmit data to node 302c and wait for a response. The node 302c can select a first tunnel endpoint from a configuration. As an example, the node 302c can be configured from the factory, statically configured in boot configuration file, configured by DHCP v4 or v6 server parameters, configured by restful API call to server such as TR-069 specification, configured by custom restful API call to server, configured by SNMP, or configured by extension of IPV6 ICMP such as ICMP Node Information Query, or a combination thereof. As an example, configuration can comprise providing a plurality of identifiers 310a, 310b to the node 302c. The identifiers 310a, 310b can be associated with one or more of the computing devices 304a, 304b. As such, the node 302c can select a first identifier 310a associated with computing device 304a. As shown in FIG. 6A, an encapsulation tunnel 602 can be provided between node 302c and computing device 304a based on the identifier 310a. In an aspect, the node 302c can transmit data received from the user device 303 through the encapsulation tunnel 602 to the tunnel endpoint at the computing device 304a. In another aspect, the node 302c can wait for a response from the computing device 304a. If a response is received by node 302c, the computing device 304a can be assumed to be available and the node 302c can continue to transmit data from the user device 303 to the computing device 304a. If a response is not received by node 302c within a time period, the node 302c can select a second identifier 310b associated with computing device 304b. The time period can be any time period such as from about 100 milliseconds to about 1 second, 1 second to about 6 minutes, about 1 second to about 5 seconds, about 1 second to about 10 seconds, about 5 seconds to about 30 seconds, about 30 seconds to about 1 minute, about 1 minute to about 2.5 minutes, or other time periods. The time period can be based upon the DHCP lease time associated with one or more of the network devices, service provider, or network provider.

Figure 6B:
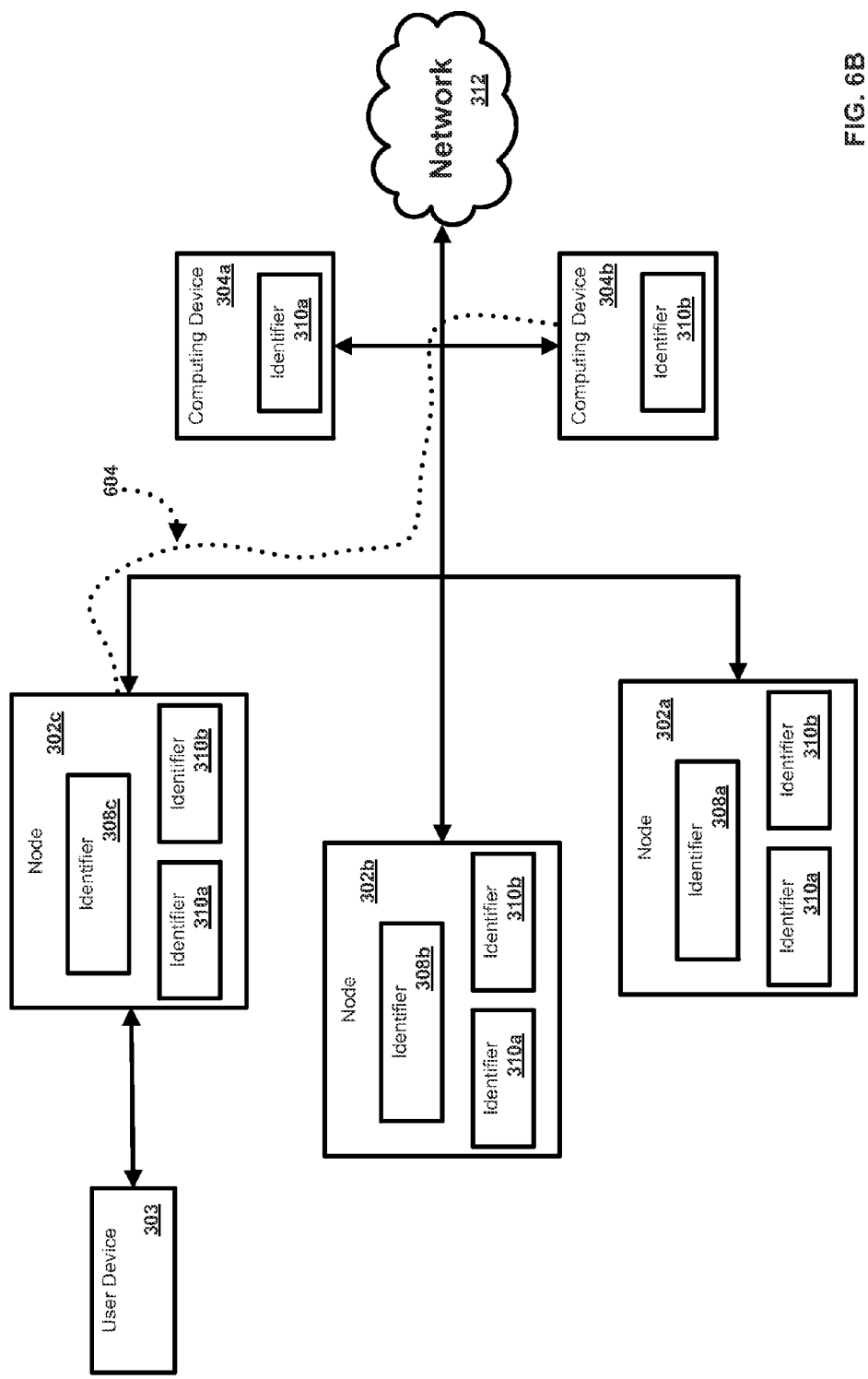
FIG. 6B is a diagram of an exemplary system and network.

As illustrated in FIGS. 5 and 6B, an encapsulation tunnel 604 can be provided between node 302c and computing device 304b based on the selected second identifier 310b. In an aspect, the node 302c can transmit data received from the user device 303 through the encapsulation tunnel 604 to the tunnel endpoint at the computing device 304b. In another aspect, the node 302c can wait for a response to the transmission of data to the tunnel endpoint. If a response is received by node 302c, the computing device 304b can be assumed to be available and the node 302c can continue to transmit data from the user device 303 to the computing device 304*b*. If a response is not received by node 302*c* within a time period, the node 302*c* can select another identifier associated with another network device and the process can be repeated. As an example, provisioning tunnels (such as GRE or soft GRE tunnels) to available tunnel endpoints can be implemented to maintain transmission of network traffic in the event of a failure of a network device or communication path.

Figure 7:
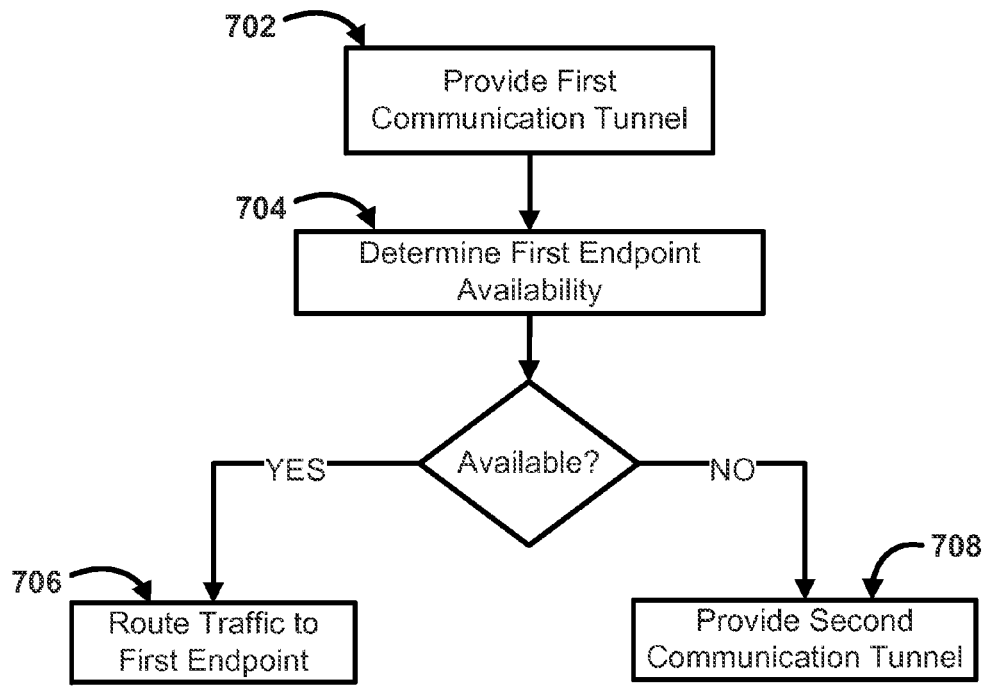
FIG. 7 is a flow chart of an exemplary method.

In an aspect, provided are methods for managing a network. An exemplary method is shown in FIG. 7. In step 702, a first communication tunnel, such as an encapsulation tunnel (e.g., GRE tunnel, soft GRE tunnel), can be provided (e.g., provisioned, established, activated, generated, etc.) between a network access point and a first tunnel endpoint. In an aspect, the encapsulation tunnel can be dynamically configured based upon a triggering event, such as a failover event, a reception of data at the access point, a selection of an identifier associated with the first tunnel endpoint, a combination thereof, and the like. As an example, the network access point can retrieve (e.g., locally or via a provisioning system) or access information to establish one or more encapsulation tunnels with one or more tunnel endpoints. In another aspect, the first tunnel endpoint can comprise a network gateway device or a concentrator or both. As a further aspect, the network access point can comprise a local area network gateway device, a wireless local area network gateway device, a router, customer premises equipment, or a combination thereof.

In step 704, availability of the first tunnel endpoint can be determined. In an aspect, determining the availability of the first tunnel endpoint can comprise one or more of an ICMP echo and echo reply, an ARP, DHCP discovery, packet counting, ICMP v6 packet such as neighbor solicitation and neighbor advertisement, or router advertisement, or a combination thereof.

In step 706, if the first tunnel endpoint is determined to be available, network traffic can be routed to the first tunnel endpoint. In an aspect, the network traffic is routed through the first communication tunnel. In step 708, if the first tunnel endpoint is determined to be unavailable, a second communication tunnel, such as an encapsulation tunnel (e.g., GRE tunnel, soft GRE tunnel), can be provided (e.g., provisioned, established, activated, generated, etc.) between the network access point and a second tunnel endpoint. In an aspect, the encapsulation tunnel can be dynamically configured based upon a triggering event, such as a failover event, a reception of data at the access point, a selection of an identifier associated with the second tunnel endpoint, a combination thereof, and the like. As an example, the network access point can retrieve (e.g., locally or via a provisioning system) or access information to establish one or more encapsulation tunnels with one or more tunnel endpoints. As another example, providing the second communication tunnel can comprise removing, replacing, disengaging, and/or deactivating the first communication tunnel. As a further example, providing the second communication tunnel can comprise establishing a replacement to the first communication tunnel by designating a new endpoint (e.g., the second tunnel endpoint) for the tunnel.

Figure 8:
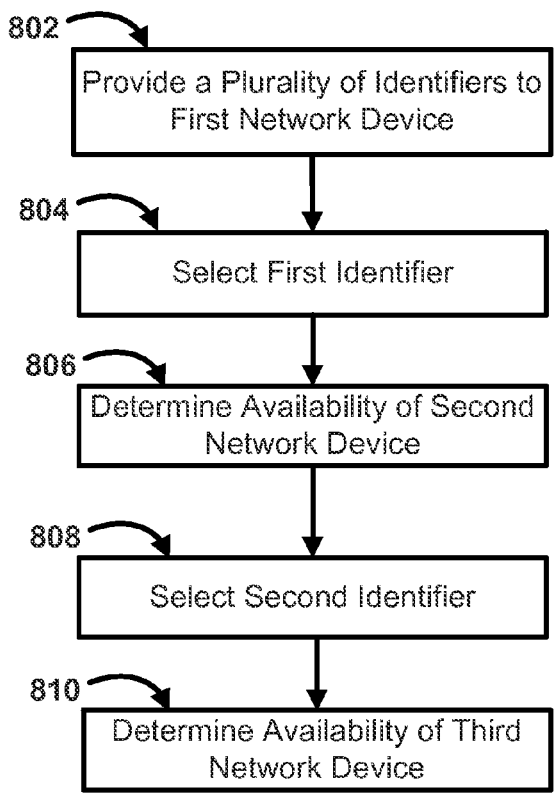
FIG. 8 is a flow chart of an exemplary method.

In an aspect, FIG. 8 illustrates an exemplary method for managing a network. In step 802, a plurality of identifiers can be provided. In an aspect, the plurality of identifiers can be provided to a first network device. As an example, the first network device can comprise a local area network gateway device, a wireless local area network gateway device, a router, customer premises equipment, or a combination thereof. As a further example, the plurality of identifiers can be provided by pre-configuration of the receiving device from the factory, static configuration in boot configuration file, configuration by DHCP v4 or v6 server parameters, configuration by restful API call to server such as TR-069 specification, configuration by custom restful API call to server, configuration by SNMP, or configuration by extension of IPV6 ICMP such as ICMP Node Information Query. In another aspect, one or more of the plurality of identifiers can be associated with tunnel endpoints. As an example, the one or more of the plurality of identifiers can be IPv4 Address, IPv6 Address, domain name system (DNS) address record, DNS service locator (SRV) Record, or the like.

In step 804, a first identifier of the plurality of identifiers can be selected. In an aspect, the first network device can select the first identifier by retrieving or accessing the first identifier from local storage, remote storage, or a provisioning system, and/or the like. As an example, the selection of the first identifier can be part of a pre-defined sequence, ranking, preference, or hierarchy of the plurality of identifiers.

In step 806, availability of a second network device associated with the selected first identifier can be determined. In an aspect, determining the availability of the second network device can comprise providing a communication tunnel between the first network device and the second network device. In another aspect, determining the availability of the first tunnel endpoint can comprise one or more of an ICMP echo and echo reply, an ARP, DHCP discovery, packet counting, an ICMP v6 packet, neighbor solicitation, neighbor advertisement, and router advertisement. As an example, the second network device can be or comprise a gateway or a concentrator or a combination of both.

In step 808, a second identifier of the plurality of identifiers can be selected. In an aspect, the first network device can select the second identifier by retrieving or accessing the first identifier from local storage, remote storage, or a provisioning system, and/or the like. As an example, the selection of the second identifier can be part of a pre-defined sequence, ranking, preference, or hierarchy of the plurality of identifiers. As a further example, the second identifier can be designated as a failover or alternative to the first identifier. In another aspect, selecting a second identifier can be dependent on a determination that the second network device is unavailable.

In step 810, availability of a third network device associated with the selected second identifier can be determined. In an aspect, determining availability of the third network device can comprise providing a communication tunnel between the first network device and the second network device. In another aspect, determining the availability of the first tunnel endpoint can comprise one or more of an ICMP echo and echo reply, an ARP, DHCP discovery, packet counting, an ICMP v6 packet, neighbor solicitation, neighbor advertisement, and router advertisement. As an example, the third network device can be or can comprise a gateway or a concentrator or a combination of both.

Figure 9:
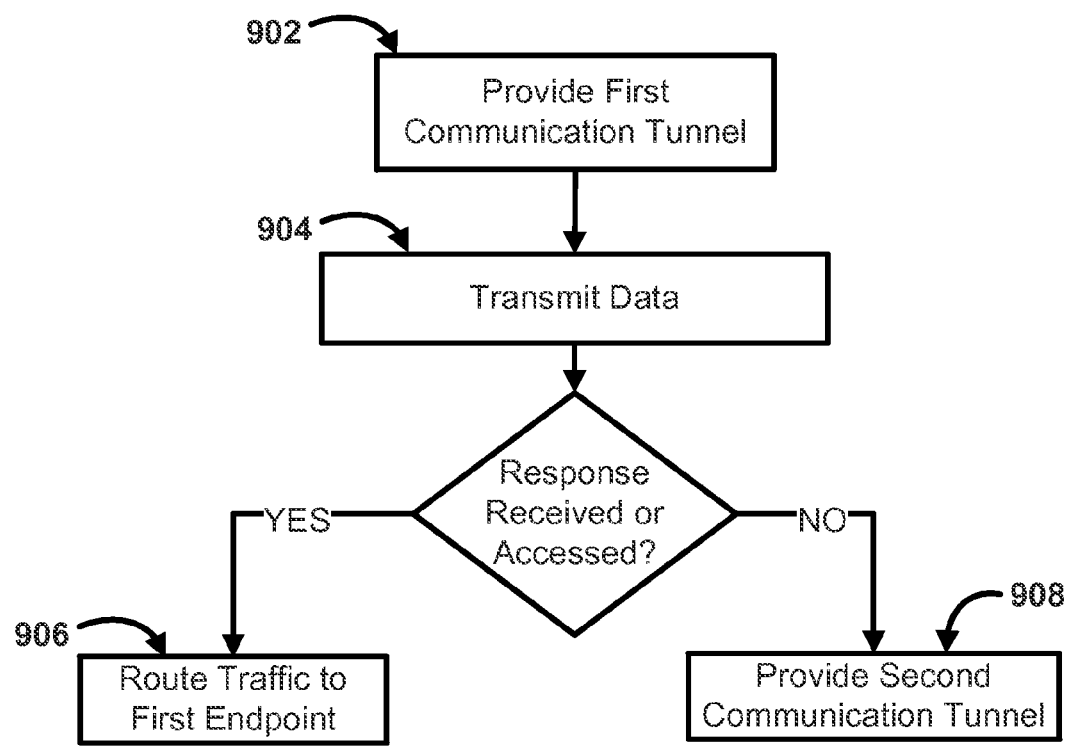
FIG. 9 is a flow chart of an exemplary method.

In an aspect, FIG. 9 illustrates an exemplary method for managing a network. In step 902, a first communication tunnel, such as an encapsulation tunnel (e.g., GRE tunnel, soft GRE tunnel), can be provided (e.g., provisioned, established, activated, generated, etc.) between a network access point and a first tunnel endpoint. In an aspect, the encapsulation tunnel can be dynamically configured based upon a triggering event, such as a failover event, a reception of data at the access point, a selection of an identifier associated with the first tunnel endpoint, a combination thereof, and the like. As an example, the network access point can retrieve (e.g., locally or via a provisioning system) or access information to establish one or more encapsulation tunnels with one or more tunnel endpoints. In another aspect, the first tunnel endpoint can comprise a network gateway device or a concentrator or both. As a further aspect, the network access point can comprise a local area network gateway device, a wireless local area network gateway device, a router, customer premises equipment, or a combination thereof.

In step 904, data such as ICMP, DHCP, ARP, neighbor solicitation, and/or network traffic can be transmitted to the first tunnel endpoint. The data can be transmitted to the first tunnel endpoint via the first communication tunnel. Transmitting the data can comprise or more of ICMP echo and echo reply, an ARP, DHCP discovery, packet counting, an ICMP v6 packet, neighbor solicitation, neighbor advertisement, and router advertisement. In an aspect, the network access point can await a response to the transmission of data.

In step 906, if a response is received from the first tunnel endpoint within a threshold time period, transmission of network traffic to the first tunnel endpoint can be continued. The threshold time period can be any time period such as from about 100 milliseconds to about 1 second, 1 second to about 6 minutes, about 1 second to about 5 seconds, about 1 second to about 10 seconds, about 5 seconds to about 30 seconds, about 30 seconds to about 1 minute, about 1 minute to about 2.5 minutes, or other time periods. By way of example, the time period can be based upon the DHCP lease time associated with one or more of the network devices, service provider, or network provider. If a response is received by the network access point, the first tunnel endpoint can be assumed to be available and the network access point can continue to transmit data to the first tunnel endpoint.

In step 908, if no response is received from the first tunnel endpoint within the threshold time period, a second communication tunnel between the network access point and a second tunnel endpoint can be provisioned. As an example, provisioning the second communication tunnel can comprise establishing a replacement to the first communication tunnel by designating a new endpoint (e.g., the second tunnel endpoint) for the tunnel. In an aspect, provisioning tunnels, such as GRE or soft GRE tunnels, to available tunnel endpoints can maintain transmission of network traffic in the event of a failure of a network device or communication path.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   dynamically generating a first communication tunnel between a network access point and a first tunnel endpoint;
   determining availability of the first tunnel endpoint based on whether a response is received to a transmission dynamically generating and traversing within the first communication tunnel;
   if the first tunnel endpoint is determined to be available, routing network traffic to the first tunnel endpoint; and
   if the first tunnel endpoint is determined to be unavailable, providing a second communication tunnel between the network access point and a second tunnel endpoint.

2. The method of claim 1, wherein one or more of the first communication tunnel or the second communication tunnel is configured as a generic routing encapsulation (GRE) tunnel.

3. The method of claim 1, wherein one or more of the first communication tunnel or the second communication tunnel is configured as a soft generic routing encapsulation (GRE) tunnel.

4. The method of claim 1, wherein one or more of the first tunnel endpoint or the second tunnel endpoint comprises a gateway device or a concentrator or both.

5. The method of claim 1, wherein the network access point comprises a local area network gateway device, a wireless local area network gateway device, a router, customer premises equipment, or a combination thereof.

6. The method of claim 1, wherein determining availability of the first tunnel endpoint comprises one or more of an internet control message protocol (ICMP) echo and echo reply, an address resolution protocol (ARP), dynamic host configuration protocol (DHCP) discovery, packet counting, an ICMP v6 packet, a neighbor solicitation, a neighbor advertisement, or a router advertisement.

7. A method comprising:
   providing a plurality of identifiers to a first network device;
   selecting a first identifier of the plurality of identifiers;
   determining, based on whether a response is received to a transmission configured to dynamically generate and traverse within a communication tunnel, availability of a second network device associated with the selected first identifier;
   selecting a second identifier of the plurality of identifiers; and
   determining availability of a third network device associated with the selected second identifier.

8. The method of claim 7, further comprising dynamically generating the communication tunnel between the first network device and the second network device.

9. The method of claim 7, wherein determining availability of the second network device comprises one or more of an internet control message protocol (ICMP) echo and echo reply, an address resolution protocol (ARP), dynamic host configuration protocol (DHCP) discovery, or packet counting.

10. The method of claim 7, wherein determining availability of the third network device comprises providing a communication tunnel between the first network device and the third network device.

11. The method of claim 7, wherein determining availability of the third network device comprises one or more of an internet control message protocol (ICMP) echo and echo reply, an address resolution protocol (ARP), dynamic host configuration protocol (DHCP) discovery, or packet counting.

12. The method of claim 7, wherein the first network device comprises a local area network gateway device, a wireless local area network gateway device, a router, customer premises equipment, or a combination thereof.

13. The method of claim 7, wherein one or more of the second network device or the third network device comprises a gateway or a concentrator or a combination of both.

14. The method of claim 7, wherein selecting the second identifier is dependent on a determination that the second network device is unavailable.

15. A method comprising:
determining a first tunnel endpoint transmitting, from a network access point to the first tunnel endpoint, data, wherein transmitting the data comprises dynamically generating and transmitting the data within a first communication tunnel between the network access point and the first tunnel endpoint;
if a response to the data is received from the first tunnel endpoint within a threshold time period, continuing to transmit additional data to the first tunnel endpoint; and
if no response to the data is received from the first tunnel endpoint within the threshold time period, providing a second communication tunnel between the network access point and a second tunnel endpoint.

16. The method of claim 15, wherein one or more of the first communication tunnel or the second communication tunnel is configured as a generic routing encapsulation (GRE) tunnel.

17. The method of claim 15, wherein one or more of the first tunnel endpoint or the second tunnel endpoint comprises a gateway device or a concentrator or both.

18. The method of claim 15, wherein the network access point comprises a local area network gateway device, a wireless local area network gateway device, a router, customer premises equipment, or a combination thereof.

19. The method of claim 1, wherein the first tunnel endpoint is not pre-configured with information about the network access point before the transmission within the first communication tunnel.

20. The method of claim 15, wherein the first tunnel endpoint dynamically generates the first communication tunnel to the network access point upon transmission of the data to the first tunnel endpoint.

* * * * *